Patented Oct. 2, 1951

2,569,746

UNITED STATES PATENT OFFICE 2,569,746

PREPARING PHENYL SILICATES FROM PHENOLS AND SiS₂

James B. Culbertson, Lockport, Hendrik de W. Erasmus, Lewiston, and Robert M. Fowler, Niagara Falls, N. Y., assignors to Union Carbide and Carbon Corporation, a corporation of New York No Drawing. Application June 8, 1949,
Serial No. 97,923

5 Claims. (Cl. 260—448.8)

This invention relates to a novel method for making phenyl silicates, and more particularly to a method for making tetra phenyl orthosilicate.

In accordance with the invention a phenyl silicate is prepared by reacting silicon disulfide ($SiS_2$) with a phenol which is free from groups, other than the hydroxyl groups, reactive with silicon disulfide. The reaction proceeds according to the following equation, wherein R is an aryl radical:

$$4ROH + SiS_2 \rightarrow (RO)_4Si + 2H_2S$$

The reaction of the invention can be carried out with substantially pure silicon disulfide, or with silicon disulfide diluted with other materials. For example the so-called annealed silicon monosulfide, which is a mixture of silicon and silicon disulfide, has been used successfully. This is the product obtained by condensing silicon monosulfide vapor slowly, or by heating silicon monosulfide below its volatilization temperature until it changes into a mixture of silicon and silicon disulfide.

In an example of how the novel method was performed, annealed silicon monosulfide ($SiS_2+Si$) was added to a stoichiometric excess of phenol ($C_6H_5OH$) contained in a reaction vessel at atmospheric pressure, and the vessel was heated in a water bath while hydrogen sulfide was removed. The tetra phenyl orthosilicate ($C_6H_5O)_4Si$ obtained as product analyzed 7.5% silicon, boiled at 185° ± 5° C. under a pressure of 20 to 25 millimeters of mercury, boiled at 400° ± 5° C. under a pressure of 760 millimeters of mercury, and had a melting point of 48° C.

What is claimed is:
1. A method for making a phenyl silicate which comprises reacting silicon disulfide with a phenol free from reactive groups other than hydroxyl.
2. A method for making tetra phenyl orthosilicate which comprises reacting silicon disulfide with phenol.
3. A method for making tetra phenyl orthosilicate which comprises heating a mixture of silicon disulfide and phenol.
4. A method for making tetra phenyl orthosilicate which comprises reacting at least four mols of phenol with one mol of silicon disulfide.
5. A method for making tetra phenyl orthosilicate which comprises reacting silicon disulfide with phenol while removing hydrogen sulfide during the reaction.

JAMES B. CULBERTSON.
HENDRIK DE W. ERASMUS.
ROBERT M. FOWLER.

REFERENCES CITED

The following references are of record in the file of this patent:

FOREIGN PATENTS

| Number | Country | Date |
|---|---|---|
| 436,808 | Italy | June 14, 1948 |

OTHER REFERENCES

Malatesta: Gazz. Chim. Ital., vol. 78 (1948), pages 753–763.